(No Model.)
T. F. TAYLOR & G. SMITH.
Automatic Telegraph.
No. 234,347. Patented Nov. 9, 1880.
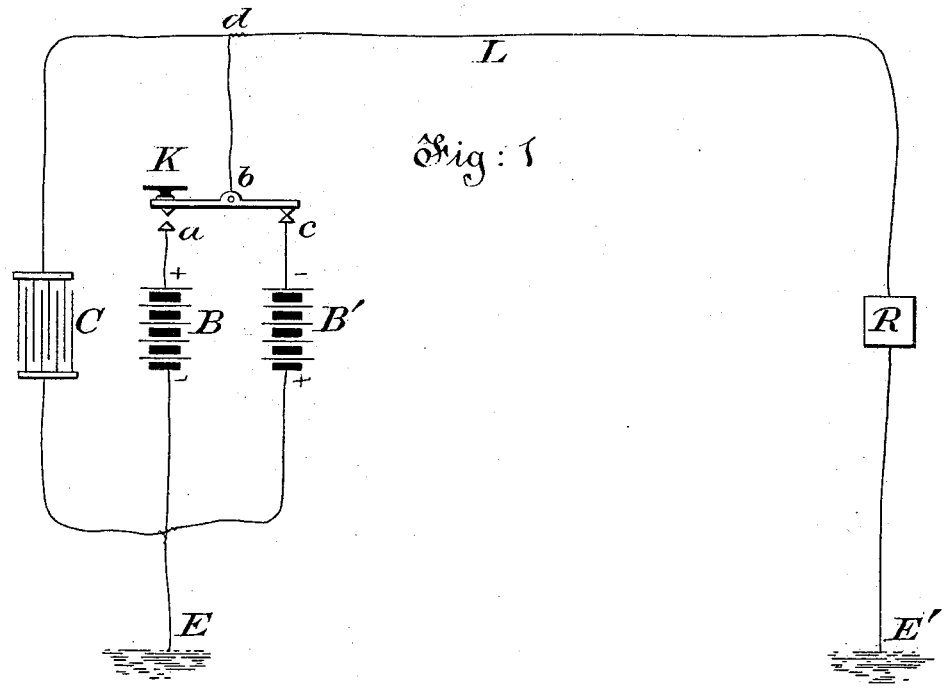
Fig: 1.
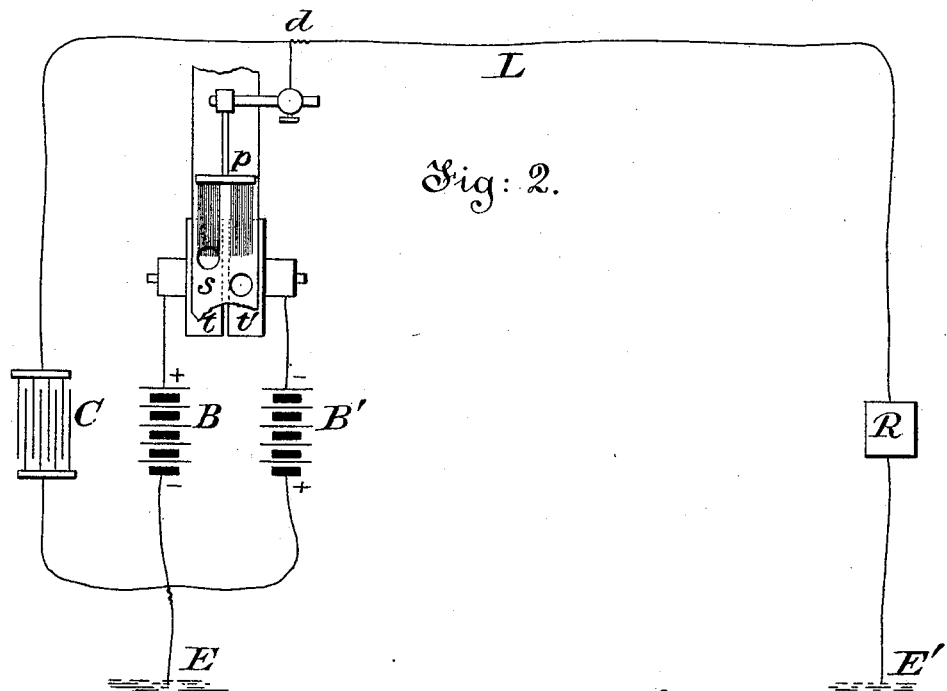
Fig: 2.
Witnesses:
Mrs. K. Lockwood French.
Miller C. Earl
Inventors:
Theodore F. Taylor,
Gerritt Smith
per Frank L. Pope,
Attorney.

UNITED STATES PATENT OFFICE.

THEODORE F. TAYLOR, OF BROOKLYN, AND GERRITT SMITH, OF ASTORIA, NEW YORK.

AUTOMATIC TELEGRAPH.

SPECIFICATION forming part of Letters Patent No. 234,347, dated November 9, 1880.

Application filed July 27, 1880. (No model.)

*To all whom it may concern:*

Be it known that we, THEODORE F. TAYLOR and GERRITT SMITH, citizens of the United States, residing, respectively, at Brooklyn, in the county of Kings and State of New York, and at Astoria, in the county of Queens and State of New York, have invented certain new and useful Improvements in Telegraphic Circuits for Rapid Transmission, of which the following is a specification.

Our invention relates to that method or system of telegraphic transmission which is usually termed the "double current" system, in which the signals are composed of pulsations or waves of positive and negative electricity, these being thrown upon the line alternately and in rapid succession, either by means of an ordinary double-current or reversing-key, or through the intervention of an automatic transmitter.

Our invention consists, first, in an improved method of transmitting alternate pulsations of positive and negative electricity through a telegraphic circuit, which method consists in accumulating or storing up a charge of electricity at the sending-station in a static condition (said charge being of the same polarity as the outgoing current) during the time of transmission of each pulsation, and then discharging the same into the line in such manner and at such time as to prolong the duration of said pulsation; second, in a combination of apparatus, whereby the hereinbefore-mentioned result is produced, consisting of a telegraphic line, a key or transmitter capable of three positions, the first position connecting said line with the positive pole of a grounded battery, the second position disconnecting the line from the earth, and the third position connecting the line with the negative pole of a grounded battery, and a condenser having one of its terminals connected to the earth and the other to a point between said key and the line.

In the accompanying drawings, Figure 1 is a diagram showing the application of our improvements to a telegragh-line arranged for operation in the ordinary manner. Fig. 2 represents the same applied to a line in connection with an automatic transmitter.

In Fig. 1, L represents an ordinary telegraph-line, one end of which is connected with the earth at E', in the usual manner, through a receiving-instrument, R, which may be of any suitable or desired character. The opposite end of the same line is connected at b to the lever of an ordinary key, K, or to any other suitable transmitter arranged and operated upon the same principle as the said key. The front contact, a, of the key is connected directly to the positive pole of a battery, B, the opposite pole of which is grounded—that is to say, connected with the earth at E. In like manner the rear contact, c, of the said key is connected with the negative pole of a second battery, B', the opposite pole of which is also grounded in the same manner as that of the first-mentioned battery.

C is a condenser, or other well-known and suitable device for accumulating or storing up electricity in a static condition, which should preferably be of a capacity at least equal to that of the line L, supposing the latter to be disconnected and insulated at or near the receiving-instrument R. One terminal of the condenser C is connected permanently to the line-wire L at a point, d, which is preferably at or near the point where the line is attached to the key K, or between the said key and the line-wire proper, as shown in Fig. 1.

When the key K is placed upon its rear contact, as shown in the figure, a negative pulsation or current will flow from the battery B', through the key, to the point d, where it finds two routes open to it, one through the line L and the other into the condenser C.

The static or charge capacity of the condenser being equal to or greater than that of the line, while the resistance offered in the first instance is less, the current will flow into and charge the condenser to its full capacity, and will also, during that time and thereafter, traverse the line L through the receiving-instrument R to the earth.

If, now, the key K be depressed, the line L will be disconnected from the earth at the sending-station during the instant in which the key is passing from the rear contact, c, to the front contact, a, during which interval the condenser C will be connected with the earth only through the line and receiving-instrument R. The condenser will therefore instantly discharge itself by that route, and in so doing will produce a current of the same polarity as the one which just preceded it, and this will constitute a prolongation of that current, which will continue during the time the line is disconnected at the key, and until it is cut off by the succeeding current of the opposite polarity, and this latter, in turn, will operate in the same manner.

Thus it will be understood that during the first part of each pulsation the current from the battery is divided, part of it going into the condenser and part of it over the line; but the instant the battery is disconnected from the line the line-current is continued by the discharge from the condenser, which follows without appreciable interval.

The charging of the condenser is effected without perceptibly diminishing the strength of current, which would otherwise normally flow to line during the same time, as the condenser, when arranged in the manner described, acts upon the same principle as a derived circuit, and by opening another channel for the current diminishes the resistance and causes a greater quantity of electricity to flow from the battery.

In Fig. 2 we have shown the application of our system to a line provided with an automatic transmitter consisting of a double brush or stylus, $p$, connected with the line L, which stylus rests upon two metallic drums or cylinders, $t\ t'$, insulated from each other and connected, respectively, with the positive and negative batteries B and B'. A strip of paper, $s$, prepared with two sets of perforations in parallel rows for transmitting positive and negative pulsations, respectively, is made to pass between the stylus $p$ and the cylinders $t\ t'$, so as to perform the same office as the key in Fig. 1—that is, to connect the line L alternately with the positive and negative batteries, and to disconnect it from the earth between the alternate pulsations, in a manner well understood.

By making use of the apparatus and method of transmission which we have described we are enabled to materially increase the number of signals which can be transmitted and recorded with distinctness in a given time, and we are also able to produce a given effect at the receiving-station by the use of a smaller battery-power at the transmitting-station, in consequence of its action being continued during the intervals between the alternate pulsations, when it would otherwise be able to produce no effect at the receiving-station.

We claim as our invention—

1. The method, substantially as hereinbefore set forth, of transmitting alternate pulsations of positive and negative electricity through a telegraphic circuit, which consists in accumulating a charge of electricity in a static condition at the sending-station of the same polarity as the outgoing current, and then discharging the same into the line, so as to prolong the duration of said current.

2. The combination, substantially as hereinbefore set forth, of a telegraph-line, a key or transmitter capable of three positions, the first connecting the said line with the positive pole of a grounded battery, the second disconnecting the line from the earth, and the third connecting the line with the negative pole of a grounded battery, and a condenser having one of its terminals connected to the earth and the other to a point between said key and the line.

THEO. F. TAYLOR.
GERRITT SMITH.

Witnesses:
JAMES YOUNG,
CHAS. H. BAKER.